United States Patent
Parvathaneni (10) Patent No.: US 10,057,807 B2
(45) Date of Patent: *Aug. 21, 2018

(54) JUST IN TIME PACKET BODY PROVISION FOR WIRELESS TRANSMISSION

(71) Applicant: Imagination Technologies Limited, Kings Langley (GB)

(72) Inventor: Chakra Parvathaneni, Cupertino, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,814

(22) Filed: Feb. 4, 2017

(65) Prior Publication Data

US 2017/0150397 A1    May 25, 2017

Related U.S. Application Data

(63) Continuation of application No. 14/448,120, filed on Jul. 31, 2014, now Pat. No. 9,603,052.

(51) Int. Cl.
*H04W 4/00* (2018.01)
*H04W 28/06* (2009.01)
*H04W 72/04* (2009.01)
*H04W 72/08* (2009.01)

(52) U.S. Cl.
CPC ....... *H04W 28/06* (2013.01); *H04W 72/0406* (2013.01); *H04W 72/085* (2013.01)

(58) Field of Classification Search
CPC .......................... H04W 28/06; H04W 72/0406; H04W 72/085

USPC .......... 370/329–352, 236–252; 709/203–224
See application file for complete search history.

(56) References Cited

U.S. PATENT DOCUMENTS

| | | | |
|---|---|---|---|
| 6,799,232 B1* | 9/2004 | Wang ...................... | G06F 12/04 341/50 |
| 7,136,396 B2* | 11/2006 | Francoeur ............... | H04L 47/10 370/473 |
| 7,421,273 B2* | 9/2008 | Diepstraten ............. | H04L 47/14 370/348 |

(Continued)

FOREIGN PATENT DOCUMENTS

WO    03/032583 A1    4/2003

*Primary Examiner* — Man Phan
(74) *Attorney, Agent, or Firm* — Vorys, Sater, Seymour and Pease LLP; Vincent M DeLuca (57) ABSTRACT

Wireless transmission is performed by storing, in a local memory, a header in association with reference(s) to memory locations in a separate, shared memory storing a payload for a given transmission. Each header can be associated with a QoS queue. When a selected payload is to be transmitted, a PHY preamble can begin, followed by a header from local memory, while a DMA transaction initiates to retrieve payload from the shared memory. Each retrieved portion of payload can include a link to a next location storing a next part of payload. A subsequent DMA is initiated for that part of the payload. A relatively fixed function circuit can initiate DMA and receive payload data; a programmable element can perform payload selection, for example. Multiple payloads can be aggregated (just before transmitting of a preamble) using header information stored in the fast local memory. Memory can be released after ACK of a corresponding payload.

20 Claims, 5 Drawing Sheets

(56) References Cited

U.S. PATENT DOCUMENTS

| | | | |
|---|---|---|---|
| 7,609,649 B1 * | 10/2009 | Bhandari | H04L 67/1097 370/252 |
| 7,684,439 B2 * | 3/2010 | Han | H04L 49/90 370/394 |
| 7,761,585 B2 * | 7/2010 | Vellanki | H04L 67/2823 709/203 |
| 7,978,609 B2 * | 7/2011 | Veeragandham | H04L 47/263 370/236 |
| 8,982,901 B2 * | 3/2015 | Uppunda | H04W 28/0268 370/235 |
| 2006/0039376 A1 | 2/2006 | Basso et al. | |
| 2007/0195787 A1 | 8/2007 | Alnuweiri et al. | |
| 2008/0062991 A1 | 3/2008 | Kumar et al. | |
| 2009/0292575 A1 | 11/2009 | Ellebracht et al. | |
| 2013/0201904 A1 | 8/2013 | Toskala et al. | |

* cited by examiner

JUST IN TIME PACKET BODY PROVISION FOR WIRELESS TRANSMISSION

CROSS-REFERENCE TO RELATED APPLICATIONS AND CLAIM OF PRIORITY

This application is a continuation of copending application Ser. No. 14/448,120 filed Jul. 31, 2014, now U.S. Pat. No. 9,603,052.

BACKGROUND

Field

In one aspect, the disclosure generally relates to wireless data networking, and in one more particular aspect, to techniques for storage and transmission of packet data in wireless networks, such as Wireless Fidelity (WiFi) networks.

Description of Related Art

Wireless networking capability has become an important component of many devices, ranging from computers, tablets, mobile phones, televisions, to embedded devices such as energy meters, speakers and appliances. Wireless Fidelity (WiFi) is an example of a networking technology that has seen widespread adoption and a gradual evolution of enhancements that have enabled higher dates.

SUMMARY

In one aspect, a wireless networking device comprises a system memory and a Media Access Controller (MAC) component coupled with the system memory through a memory interface. The MAC component includes a private Random Access Memory (RAM) sized to store a respective header for a number of MAC Payload Data Units (PDUs) in association with a pointer to a respective location in the system memory. The MAC component includes PDU management circuitry for selecting a PDU to be transmitted based on the headers stored in the private RAM. Direct Memory Access (DMA) circuitry of the MAC component is configured to receive the pointer associated with the selected PDU and initiate a transaction with the system memory to begin retrieving payload data for the selected PDU. The payload data is retrieved and supplied to a transmit path before the header for the selected PDU has been completely transmitted.

The payload can be stored in system memory, at a number of discontinuous physical locations. Pointers located with the payload data, or separately enumerated are stored to allow the payload data to be retrieved in an appropriate order for transmission. Each distinct memory transaction for payload data can be timed to reduce an amount of temporary buffer space required to store the payload data as it is returned and staged for provision to the transmit path.

Some implementations may provide a programmable component that manages intake of payloads for transmission, construction and storage of MAC layer headers, and obtaining allocations of memory for storage of the header and the payload in the private and system memories respectively. A limited configurability component that operates under microcode control, has fixed function circuitry, or a combination of both can be coupled with the programmable component and is tasked with receiving an indication of a location in the private memory storing a header of a payload for transmission, and a reference to the system memory where the payload is stored. The limited configurability component initiates the memory transactions for the payload and directly receives the data, for provision to the transmit path, without involvement of the programmable component.

Portions of the private memory and the system memory can be released after receive of a transmitted payload is acknowledged. A pool of free slots in the private memory for header storage and a pool of free slots in the system memory for payload storage can be maintained. In some cases, a payload, such as a TCP/IP packet to be transmitted, has been stored in a chain of buffers in the system memory. An implementation may receive a pointer to that payload, read a portion of the payload, construct a MAC header, and store the MAC header in a private RAM, while leaving the rest of the payload undisturbed. In another implementation, the payload may be copied to another portion of the system memory, and pointers appended to or updated as needed.

An aspect relates to a Media Access Control (MAC) element of a wireless networking device. The MAC element has a private Random Access Memory (RAM) controlled by the MAC element and a programmable processor. The programmable processor is configured to provide a plurality of Quality of Service (QoS) queues in the private RAM, to produce a header of a MAC Payload Data Unit (PDU), to determine a QoS to be given to the MAC PDU for transmission, to store the header in the private RAM, associated with a queue of the plurality of queues associated with the determined QoS, and to obtain an allocation from a system memory to store payload data of the MAC PDU. The MAC element also has a real time operation component configured to receive an indication from the programmable processor to begin transmit processing of a PDU by receiving a reference to a location in the private RAM at which is stored a header for the PDU to be transmitted, to access the header, and a reference to the system memory that is associated with the header, to initiate one or more transactions to receive payload data from the system memory, to provide the header to a physical layer for transmission, and to receive the payload data from the system memory before the header has completed transmission by the physical layer, and to provide the payload data to the physical layer.

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

Figure 1:
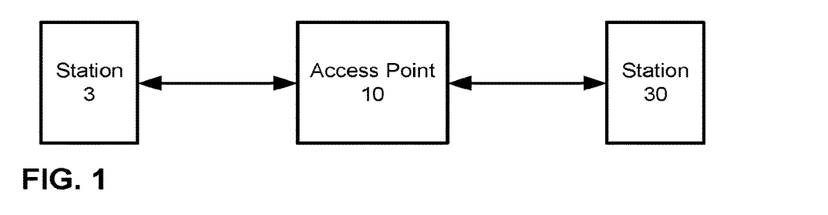
FIG. 1 depicts an example system context in which devices can implement aspects of the disclosure.

FIG. 1 depicts an example arrangement in which stations 3 and 30 communicate with an access point 10. Access point 10 can be implemented within a device that also offers functionality other than access point functionality. For example, access point 10 can be implemented within a gateway that also implements network address translation, DHCP, management, packet inspection, a firewall, bridge functionality to heterogeneous physical media (e.g., mobile hotspot functionality), and so on. Similarly, stations 3 and 30 represent any of a variety of devices, ranging from desktop or laptop computers to tablets, smartphones, embedded transceivers in consumer electronics, voice over IP telephones, gadgets, such as watches, and so on. Implementations of the disclosure can be practiced both in stations 3 and 30 and in access point 10.

Figure 2:
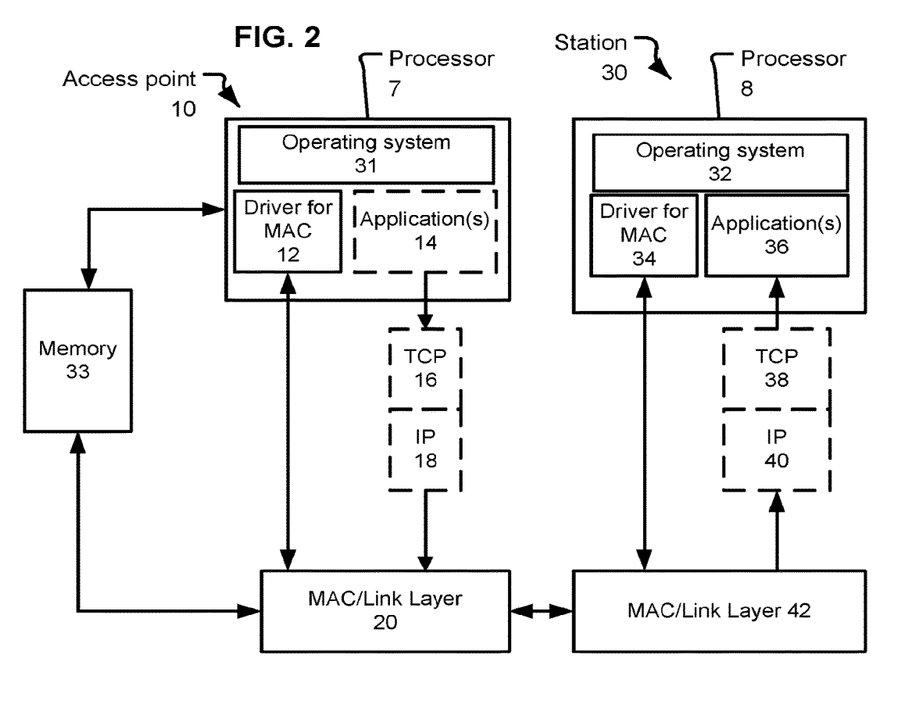
FIG. 2 depicts further aspects of devices that can implement aspects of the disclosure.

FIG. 2 depicts example aspects of access point 10 and station 30. Each of access point 10 and station 30 can include a processor, respectively processors 7 and 8. These processors can execute an operating system, or other framework. For example processors 7 and 8 can execute a variant of Linux, or a real-time operating system (represented as operating systems 31 and 32). Other software executing on such OS can include a virtual machine. An OS for access point 10 is more likely to be an embedded OS or an OS without a graphical user interface, than OS 32 for station 30. Drivers 12 and 34 for a respective Media Access Control (MAC) device can execute with each OS 31 and 32, providing a service to applications 14 and 36 that may execute on that OS. Similarly, each of access point 10 and station 30 can include a TCP/IP stack 16/18 and 38/40, as well as support for other transport protocols, such as UDP, and other approaches to delivery data for transmission to MAC/link layer 20 and 42, respectively. As such, access point 10 and station 30 may provide similar function components, except that station 30 is more likely to support a full-featured set of user interface functionality, while access point 10 may provide a variety of services and embedded functions, and only directly interface with a user for configuration or management, through a console or command line interface.

FIG. 2 also depicts a memory 33 coupled to processor 7 and to MAC layer 20 of access point 10. A similar memory also may be provided for station 30. Memory 33 may be composed of one or more physical memories, and an interface for each of processor 7 and MAC layer 20 also may vary with different implementations. Access point 10 may host drivers and contain interface hardware for multiple kinds of networks. For example, access point 10 may include an Ethernet switch or hub. Access point 10 also may couple with a broadband interface, such as a DSL line, cable modem, fiber optic interface, and so on. As such, access point 10 can serve as an aggregation point for devices connected wireless, for transmission over another network, such as Ethernet or a broadband network. These various details are not separately depicted, to maintain clarity of the disclosure.

Figure 3:
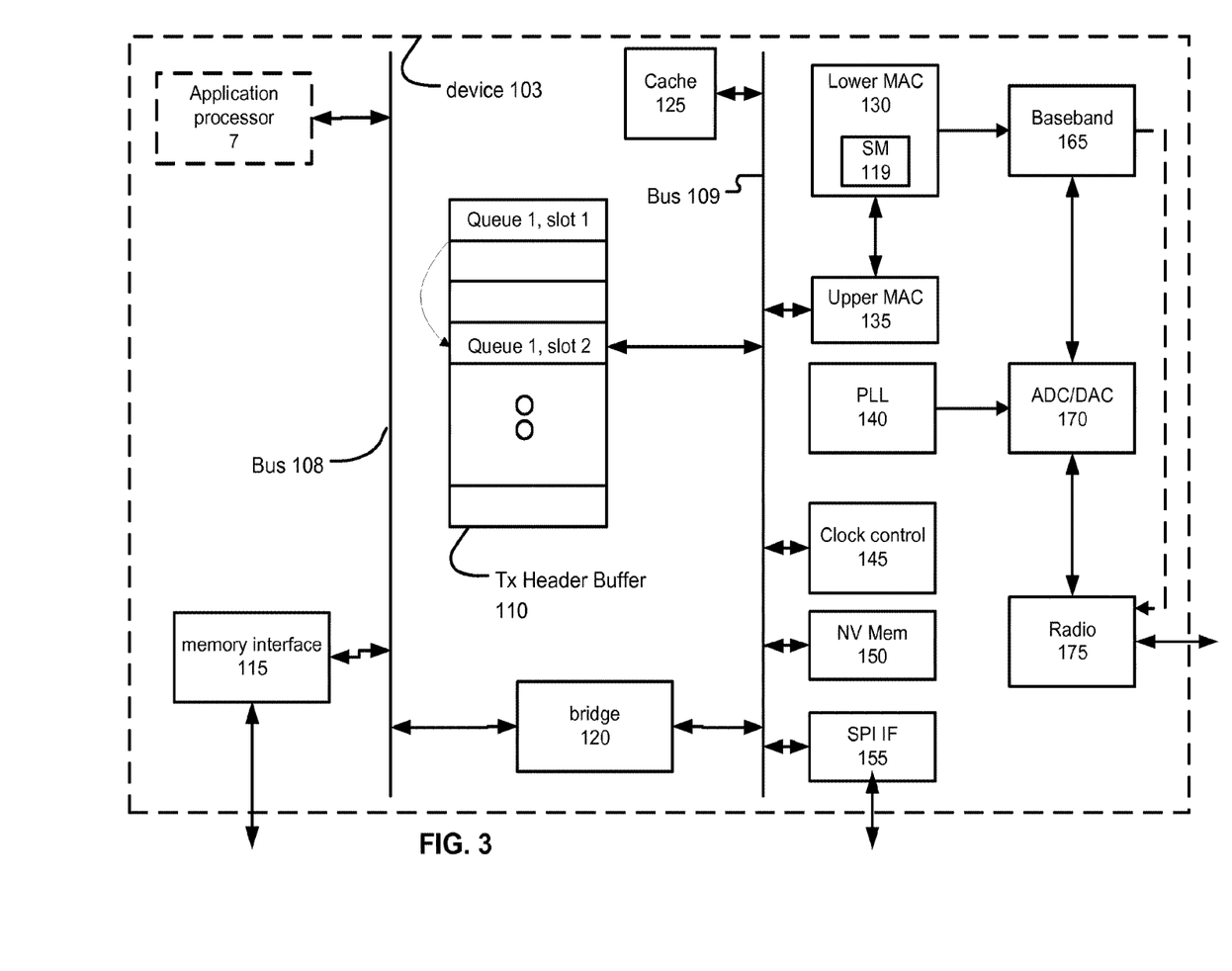
FIG. 3 depicts an example implementation of a chip that can implement aspects of the disclosure.
Figure 4:
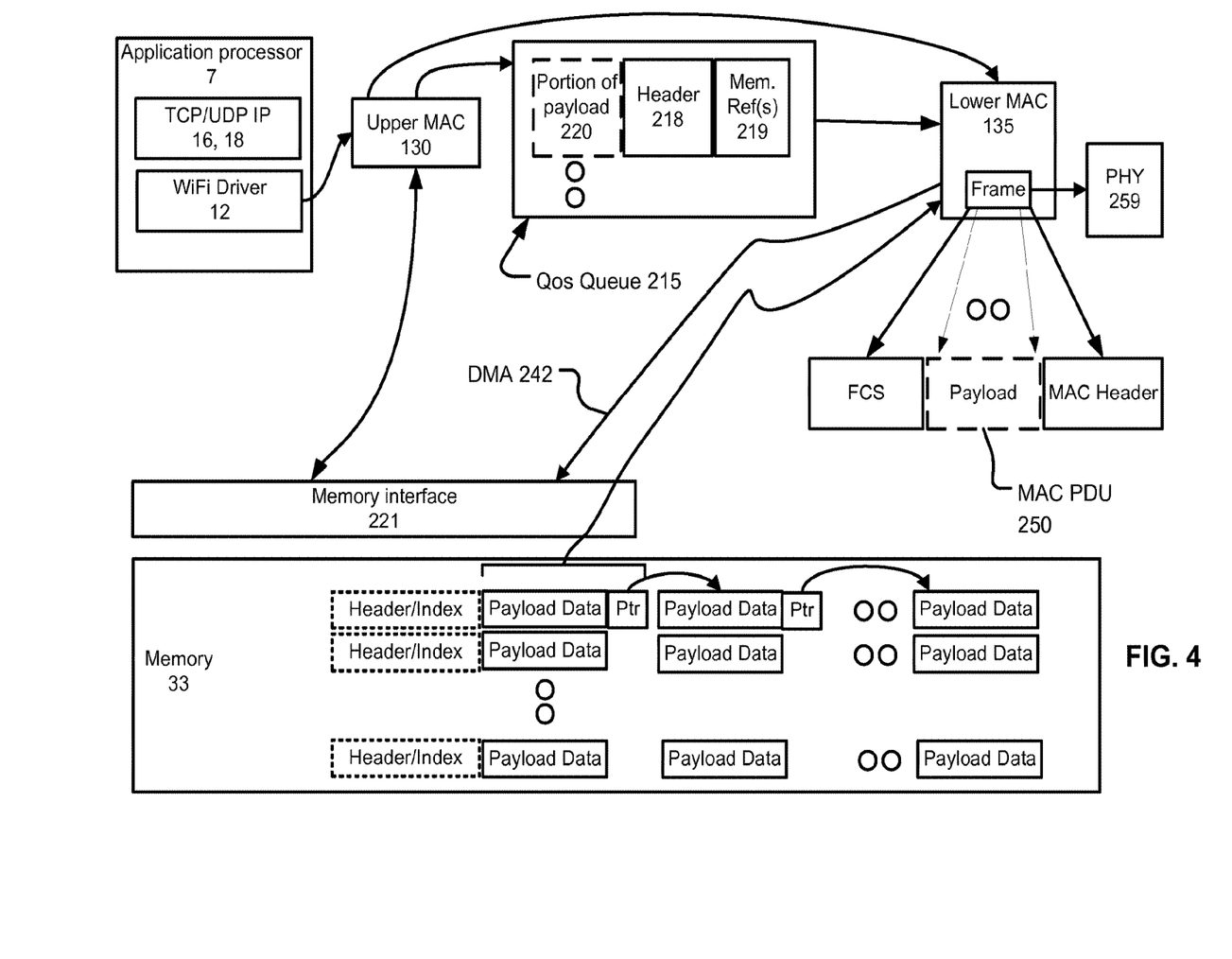
FIG. 4 depicts interaction of elements of the chip of FIG. 3 according to aspects of the disclosure.

FIG. 3 depicts an example block diagram of a device 103 implementing elements of station or access point 10 (except memory 33). Components depicted in FIG. 3 will be introduced, and then more detailed aspects of some of these components and their interoperation will be addressed. Device 103 can be implemented in a variety of ways. In one way, device 103 is fabricated on a distinct semiconductor substrate from a main memory, while in another implementation, bulk memory for storing payload data can be implemented on the same semiconductor substrate in a system on chip configuration. In such a system on chip implementation, a distinction between a memory storing frame headers and the bulk memory for payload data includes that the memory storing frame headers can be implemented as a static RAM, while the bulk memory can be implemented as a Dynamic RAM (DRAM). The SRAM may be faster and consume more area and power per bit of storage capacity, such that savings in area (and hence cost) and power consumption may still result from using DRAM, such as an embedded DRAM for payload data storage. Other technologies that place multiple die within a package, such as a memory for payload storage and a substrate containing components of device 103 also may be used in some implementations.

Application processor 7 is shown as being optional, in that some implementations of device 103 can interface with a distinct application processor, or other control mechanism. Where device 103 is constructed as an SOC, application processor 7 also may be integrated in that same system. Thus, FIG. 3 shows an example of a relatively highly integrated device. However, even if application processor 7 is provided, implementations of the disclosure may also include another processor that interfaces with device 103. In any case, it is generally expected that the Media Access Control (MAC) functional modules depicted in FIG. 3 will serve to handle media access on behalf of various applications or higher layers of the network stack. However, there are a variety of ways in which the MAC functional modules can be interfaced with these various applications and higher layers of the network stack and the following is exemplary.

A memory interface 115 interfaces device 103 with an external memory element, such as a Dynamic Random Access Memory (DRAM) bank. Considering FIG. 2, memory interface 115 serves as an interface for both processor 7 and MAC layer 20. A bus 108 couples memory interface 115 with elements that require access to memory, including processor 7, and a bridge 120. Bridge 120 is provided to interface multiple elements that each in general need lower bandwidth provision than functional units coupled directly to bus 108. As such, some devices described below may be connected to bus 108 in some implementations, and the example of FIG. 3 implies no restriction as to different implementation approaches.

A Transmit (Tx) header buffer 110 is coupled with a bus 109 that couples through bridge 120 to memory interface 115. Bus 109 also couples with a cache 125, a non-volatile memory 150, a SPI interface 155, which has a separate Input/Output (IO) from device 103. An upper MAC 135 couples with bus 109 and with lower MAC 130. Lower MAC 130 couples with a baseband 165, and with an Analog to Digital Converter (ADC) and Digital to Analog Converter (DAC) 170. ADC/DAC 170 couples with a Phase Locked Loop (PLL) 140 and with a radio 175. Baseband 165 also may couple with radio 175. Radio 175, ADC/DAC 170, PLL 140 and Baseband 165 collectively are used to implement a physical (PHY) layer of device 103. These example components and their interrelationship are provided by way of context, and different implementations of the disclosure may provide different chip architectures and other implementations of these features and functional elements.

Upper MAC 135 can be configured with code supplied across bridge 120, and stored in cache 125. Such code can originate from application processor 7, for example. Lower MAC 130 can be implemented mostly in hardware and performs real-time functions. Lower MAC 130 may be configured by microcode, by code or by parameters obtained from non-volatile memory 150. Lower MAC 130 communicates with upper MAC 135 to receive indications of Payload Data Units (PDUs) to be transmitted from device 103. In this disclosure, PDU is relative to the part of device 103 being addressed. Relative to the PHY, a PDU includes the entire MAC frame, plus other data, such as a preamble. Relative to the MAC, a PDU includes address layer data (e.g., an IP packet), and so on. For convenience, the term "frame" is used to refer to both header and payload data for MAC layer data, which includes a MAC header, a body, and a frame check sequence, for example. As used here, an aggregated multiplicity of PDUs (AMPDUs) can be considered a frame by itself, but also contain multiple frames. For example, in 802.11ac, all transmissions can be in AMPDU format, even if containing only a single MAC subframe. A number of frames within the AMPDU can depend on how many frames identified that are capable of being aggregated. Typically, aggregation of frames was performed while frames were being stored in an onboard memory of a transmit device. In some implementations of the disclosure, such frame aggregation is performed after a transmit allocation is determined, so that more frames are available for potential aggregation, as explained below. Frequently, PDUs will be packets of data from higher layers of a networking stack, such as TCP/IP or UDP packets. As such, a MAC PDU may often contain a packet, and in such circumstances, a PDU can be called a packet, if more convenient.

Implementations of the disclosure store headers for MAC frames waiting to be transmitted in Tx header buffer 110. Some implementations provide that Tx header buffer 110 does not store an entire body (i.e., payload of the MAC frame). In some implementations, Tx header buffer 110 stores no portion of the body of the MAC frame. In some implementations, Tx header buffer 110 stores a relatively small portion of the body. For example, an 802.11ac MAC header includes up to 34 bytes of data (not including the FCS). Some implementations may store only these 34 bytes in Tx header buffer 110, and store the remainder of the payload of a MAC frame in an external memory (e.g., a memory that is not private for use by upper MAC 135, or even device 103 as a whole, and is instead shared among multiple functional elements). In addition to storage of such header data in Tx header buffer 110, each distinct frame header is associated with a reference to a location in the external memory at which the next part of the MAC frame can begin to be retrieved. For example, a pointer to a location in memory from which to start retrieving payload data can be provided. Such pointer can be translated, by memory interface 115, or another memory interface element, such as a DMA unit. While many implementations may use pointers or references to physical memory locations, some implementations may provide virtualized memory, such that the pointer does not need to directly identify physical memory in those implementations.

Tx header buffer 110 can be divided into a number of distinct slots, each slot for holding a header portion of a different MAC frame, such slot also may provide a predetermined location or relative position for the reference to the location in external memory. An amount of memory in Tx header buffer 110 allocated to the reference can vary based on addressability of the memory, and size of the memory, for example. The slots can be organized as a pool of free slots, from which an allocation is made, when new data (e.g., a new payload) arrives to be transmitted.

Some implementations of Tx header buffer 110 provide queues associated with different Quality of Service (QoS); each MAC frame is allocated to a respective QoS queue. In one example, each client that is supplying MAC frames for transmission is allocated at least one QoS queue. What constitutes a different client can vary among implementations. In one example, each application executing on station 30 can constitute a different client. In another example, each device or station connecting to access point 10 can constitute a different client. In a further example, each application in each device or station connecting to access point 10 can constitute a different client. Some implementations may group similar applications of different devices into the same QoS queue.

Each QoS queue can be associated with a specification of parameters that will be observed for frames stored in that queue. For example, jitter and latency specifications can be provided for each queue. Service requirements for each incoming frame can be specified, and used to select a particular queue for that frame.

Some implementations may provide a current tail pointer (queue_tailptr) to identify a location in memory that represents a current tail of a given QOS queue. A pointer to the allocated slot (slot_ptr) can be appended to that location, and the current tail pointer (queue_tailptr) updated to identify an end of the allocated slot. For example, Queue 1, slot 1 includes a pointer to a slot holding data for slot 2 of Queue 1. As such, queues can be implemented using a random access memory, and need not be implemented using physically distinct memories. Implementations of the disclosure can be restricted to remove data for transmit from a particular queue in strict First In First Out (FIFO) order. However, implementations do not necessarily require that behavior, and non-FIFO order operation could be provided as an operational mode, for example.

A number of QoS queues that is provided can vary in different implementations. Since implementations of the present disclosure do not store an entirety of a payload for frames waiting to be transmitted, implementations of the disclosure can supply more QoS queues, deeper QoS queues, or some combination of numerosity and depth of queues, than a device using the same size of internal memory but which stores an entirety of the payload. Some implementations may use a smaller internal memory, while still offering the same number of queues. As an example, devices storing an entire payload for each frame awaiting transmission may have an internal memory of about a megabyte, while some implementations according to the disclosure may have a memory sized around 16 kB, 32 kB, 64 kB, 128 kB or 256 kB. A further advantage enjoyed by implementations of the disclosure is that more frames may be able to be aggregated into an AMPDU, because a device implementing the disclosure can have visibility to more frames waiting to be transmitted. Such a device can, for example, hold general data traffic for a relatively long period of time, and aggregate more frames of such general data, even while servicing higher priority traffic according to required latency and jitter requirements.

Being able to aggregate more frames would be expected to result in further network efficiency, because one of the biggest sources of overhead in 802.11 is acquiring the channel for the right to transmit. Aggregation works to decrease an amount of relative overhead to transmit a given amount of data by allowing a device to obtain access to the radio channel and then using that opportunity to transmit multiple frames. While aggregation is one example application of the disclosure, benefits of implementing the disclosure are not dependent on aggregation or require aggregation.

In one approach, individual frames (i.e., a packet of data for which a separate CRC will be calculated) can be aggregated together into a transmission that does not provide inter-frame spacing (IFS) between those aggregated frames. The aggregated frames are selected to have the same destination address. A further criteria can be that all the aggregated frames have the same Quality of Service category (e.g., they are obtained from the same queue, where queues are associated with respective quality of service categories). Whereas it is usually the case that aggregation of frames is performed during storage of a given packet, implementations of the present disclosure can select from among packets available at a time when a transmission is initiated. Being able to select packets for aggregation at that time may allow a larger pool of packets from which to select candidates to aggregate.

FIG. 3 depicts further details concerning functioning of device 103. Application processor 7 and TCP/UDP IP stack 16, 18 (FIG. 1) communicates with driver 12 to provide a packet (e.g., an IP packet) for transmission from device 103. Driver 12 communicates the packet to upper MAC 130. In one example, upper MAC 130 uses memory interface 221 to obtain an allocation of memory at which to store a body of such packet; in another example, a payload may already be stored in system memory in a format usable by upper MAC 130. In some implementations, memory can be allocated in slices of 128 bytes or 256 bytes, rather than based on a maximum payload size, such as 2048 bytes.

Upper MAC 130 provides MAC header information in accordance with details in the IP packet, such as source and destination IP addresses. Upper MAC 130 also selects a QoS queue (e.g., QoS queue 215) with which to associate the MAC frame created for the packet. Upper MAC 130 stores header 218 (which can include MAC frame descriptor data), and in some implementations, a first portion of the payload (which can include, for example, TCP/IP header information), and a reference to the memory location from which the payload or remainder of the payload can begin to be retrieved.

Upper MAC 130 can execute a MAC frame selection process, which can account for QoS, and results in selection of MAC frames to begin transmission. In response to determining to transmit a given MAC payload, upper MAC 130 can indicate to lower MAC 135 a location or locations in Tx Header Buffer 110 storing data for that packet; FIG. 3 depicts such data includes header 218 and a reference to memory 33, at which payload data can be retrieved. Optionally, Tx header Buffer 110 stores a portion 220 of the payload. Lower MAC 135 indicates to PHY 259 to begin transmission for the packet. Transmissions of PHY 259 to initiate transmission of data can vary depending on circumstances. In an example, such transmission includes beginning to send a preamble sequence (and not a RTS, for example). Lower MAC 130 also retrieves the header 218 and memory reference 219. Lower MAC 135 initiates a DMA transaction 242 to memory interface 221 for data stored at the referenced location. Where a portion of the payload is stored on device 103 (e.g., in QoS queue 215), the data can be the data that is next to be transmitted. While aspects of the disclosure could be practiced in a situation where an RTS/CTS protocol is followed, there would be more time to retrieve payload data from system memory, and therefore, tighter constraints imposed by a simple preamble transmission are addressed herein.

An amount of payload data returned in response to such a transaction can vary depending on a memory technology and configuration used to implement memory 33, and on other circumstances. Some implementations may support a configurable DMA subsystem through which a transaction size can be adjusted. In one implementation, each memory transaction returns a pointer to a next location in memory at which a subsequent portion of the payload can be retrieved. Such implementation provides a capability to allocate non-contiguous regions of memory for storing packet data. Such implementations also accommodate packets of varying size. In one approach, driver 12 obtains an allocation in memory 33 and divides the payload across allocated memory segments, and appends pointers in the data stored in the memory segments, so that those pointers can be followed when reading the data.

Such implementations also can accommodate a streaming implementation in which an up-front allocation of an area of memory of a pre-determined size is not made, and rather, payload data is received and stored in portions of memory allocated as needed. The portions of memory can be from a region of memory 33 that is allocated for use by device 103 by an operating system executing on application processor 7. Different implementations may use different block sizes for memory allocation for payload data. Implementations that use longer latency memories can be configured to use larger memory block sizes, for example. The payload data is returned to lower MAC 135, as shown by MAC PDU 250. PHY 259 receives and transmits the data. While some implementations provide that a driver handles allocation of memory and storage of payload data in such memory, other implementations may provide that upper MAC 135 performs these functions, and can use memory interface 115 for such purpose.

Some amount of time is required to traverse PHY 259 with each portion of data. This time can be characterized in different implementations. Also, some amount of time or expected range of times is required to initiate an initial memory access and receive payload data in response to that request. A state machine 119 controls data transmission. In the example of FIG. 3, state machine 119 is part of lower MAC 130.

A given implementation can be configured with one or more maximum transmit times; in some cases, these maximum transmit times can be associated with a respective QoS. Based on a symbol rate, it can then be determined how much data can be transmitted during a particular transmit interval. State machine 119 can attempt to aggregate as many frames as possible while staying within the maximum transmit time. In one example, state machine 119 determines that frames from a particular queue should be selected for transmission, and then can access header information for a first frame in the queue. In implementations, the header information can be associated with a pointer to a header for the next frame in that queue. If the destination addresses of both those frames match, then they can be aggregated. If those frames are aggregated, then state machine 119 can continue to the next frame (following the next header pointer), and make the same determination for the destination address of that packet. In a FIFO implementation, once a destination address of a subsequent packet fails to match, then aggregation stops. In a non-FIFO implementation, a frame with a non-matching destination address can be skipped, and a subsequent, matching frame can be transmitted. In such a case, pointers will need to be modified to remove that out of order frame from the chain while keeping the skipped frame in the same relative order. While this form of non-FIFO transmission may violate an implicit QoS characteristic, it would not make the QoS provided to the skipped frame worse. In another implementation, if a given queue were entirely traversed, and there was still room for transmission in a given aggregation, then a next queue could be examined for frames with matching destination addresses. Here also, such a feature would not provide worse QoS to any frame, since the channel will be consumed for a fixed transmit time, regardless of how many packets actually are aggregated for transmission into that fixed transmit time.

State machine 119 also can time initiation of data retrieval to reduce buffering requirements. In particular, state machine 119 can be configured with information about a maximum jitter (range of delay times) to obtain frame data from bulk memory (i.e., not buffer 110) for transmission. For example, a transmission time may be on the order of 500 microseconds, and a worse-case latency may be on the order of 2-3 microseconds, while an average may be around 500 nanoseconds. In some implementations, an available time between a determination to transmit from a given queue until payload data from memory needs to be transmitted is around 16 microseconds. Under such circumstances, an implementation could delay a memory transaction for up to around 13 microseconds from an earliest possible initiation point. Based on current transmit progress of a given set of data, state machine 119 can initiate a memory transaction for data, so that the data will return from memory close to a time when it will need to be transmitted. While some amount of buffers would be expected to exist, this amount of buffering is reduced considerably compared with simply retrieving and buffering an entire frame payload.

Figure 5:
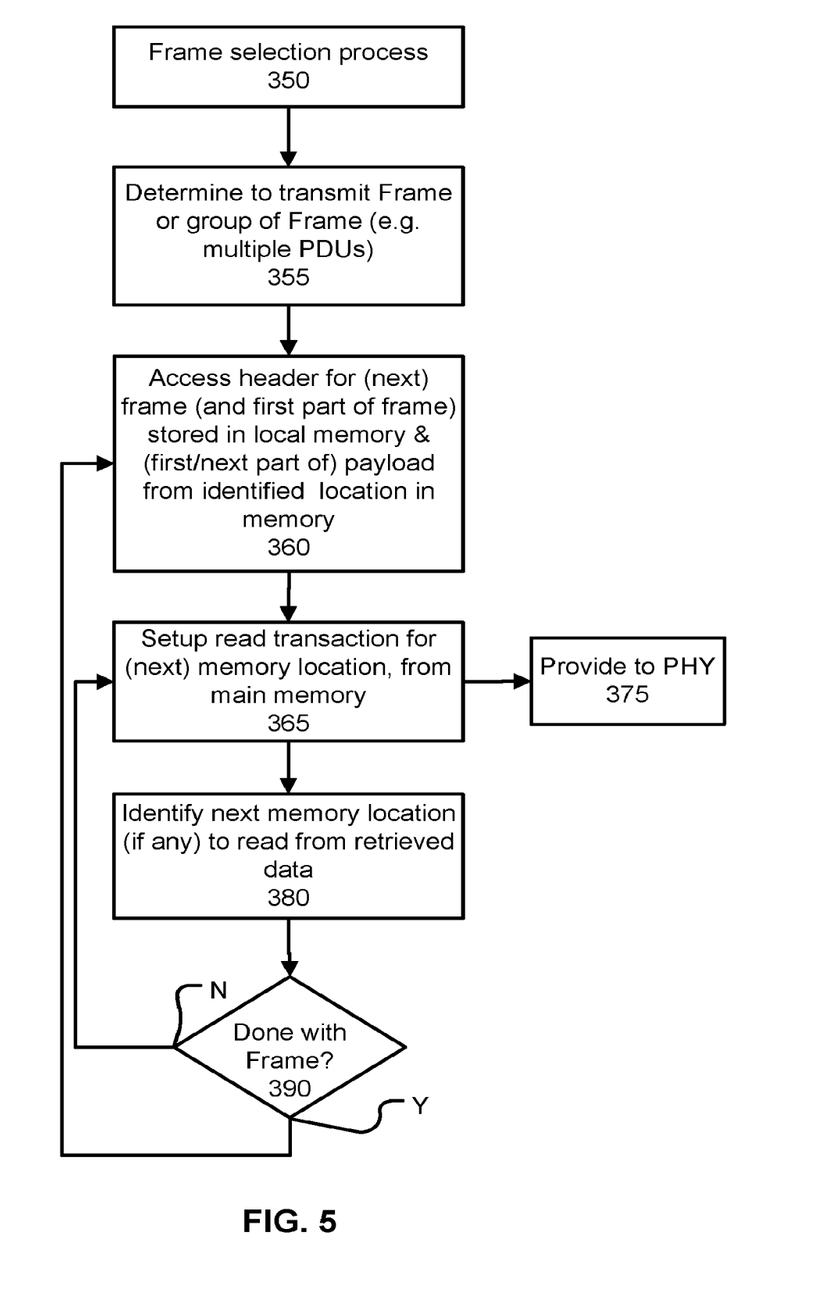
FIG. 5 depicts aspects of an example process according to the disclosure.

FIG. 5 depicts an example process for selecting and sending MAC frames, in accordance with the above disclosure. At 350, a frame selector process executes and results in a determination, at 355, to transmit a frame or group of frames. For example, frame selection process can use QoS criteria to select from among different traffic types. Frame selection process also can attempt to aggregate a number of frames waiting to be transmitted, consistent with QoS criteria. For the first frame selected, header and memory pointer information can be accessed, at 360. At 365, a read transaction is setup for the payload data that is next to be transmitted, and upon receipt of that data, that data can be provided to a physical layer for transmission, at 375. Also, at 380, a next memory location is identified, from which further data will be retrieved, if any. At 390, if the frame is done, the process can return to access a header for a next frame to be aggregated, and a reference to a memory location storing payload data for that subsequent frame, and process such according to the same flow. However, at 390, if the frame is not done, then a read transaction for a subsequent portion of the payload can be setup, at 365, and so on. Each of these read transactions can be timed so that data returning from each subsequent read transaction can be stored in the same buffer locations that stored data that had been transmitted for a prior portion of the payload. In one implementation, each DMA request is timed to occur approximately 8 microseconds apart and can include 2 symbol times worth of data.

Figure 6:
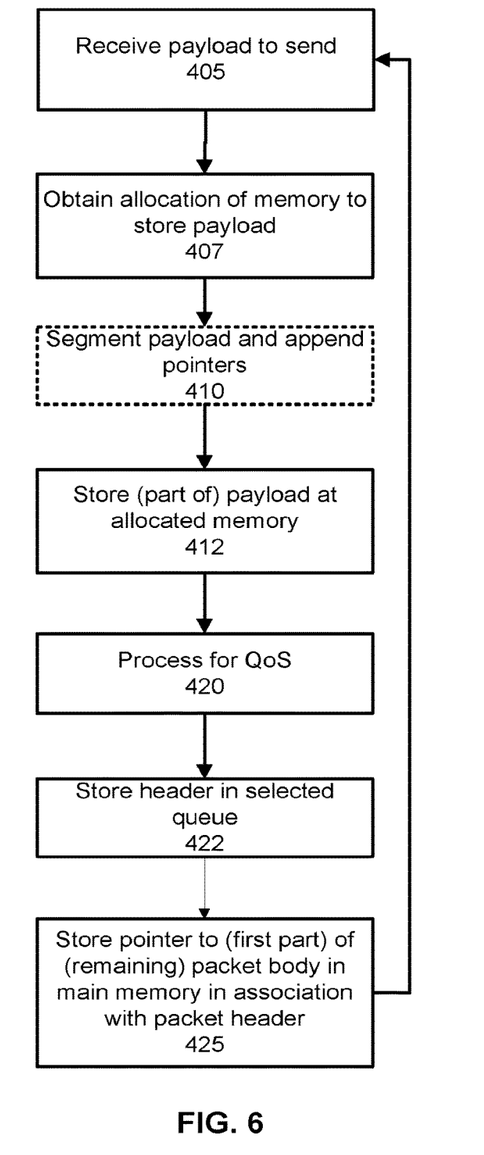
FIG. 6 depicts an example process of intake processing of data for transmission according to the disclosure.

FIG. 6 depicts an approach to intake processing, at device 103, of a payload (e.g., a packet) for transmission. At 405, a payload is received to be sent (e.g., a TCP/IP packet). At 407, an allocation of memory to store a body of the payload is stored. In the context, of a TCP/IP packet, such payload includes the payload of the TCP/IP packet, as well as TCP/IP header information. At 410, the payload is segmented into sections for storage into the allocated locations. It was explained that allocated memory in implementations of the disclosure need not be continuous. In such implementations, a pointer to each subsequent portion of memory can be appended to the payload, to identify a next memory location storing the payload. A last memory location can include a completion indication, which can be a pre-arranged bit sequence. Other implementations can indicate how many memory locations store payload for a particular MAC frame (i.e., an encapsulation of the received payload) for transmission. At 412, the payload with appended pointers is stored at the allocated memory locations; some implementations may maintain an initial part of the payload on chip. At 420, the payload is processed for QoS. For example, layer 3 or layer 4 QoS information may be present in the received payload. In other circumstances, particular ports, MAC addresses, IP addresses, and so on may be associated with a particular QoS specification or an application that has an associated QoS specification. An outcome of 420 includes a selection of a queue for the payload, and at 422, a MAC header produced for the payload, and at 425, references to the memory locations storing the payload and optionally a portion of the payload are stored on chip in association with the header.

Some implementations may involve the device 103 receiving a pointer to a payload to be transmitted, such as a TCP/IP packet. Such pointer can be created by a driver executing on application processor 7, or by another process that interfaces with the driver to provide a pointer to a location storing payload data (e.g., a TCP process that produces a TCP/IP packet for transmission). In some implementations, upper MAC 135 can read only a first part of data identified by such a pointer, such as to read TCP and IP header information, and then upper MAC 135 can construct a MAC header based on such information. Upper MAC 135 may copy the payload data from an original location to a location in system memory; in some cases, the payload may not be originally stored in system memory, and upper MAC 135 can copy the payload to system memory. In so doing, upper MAC 135 can append a pointer to each payload storage location that identifies a storage location for a subsequent payload element. Thus, embodiments of the disclosure can be implemented to read, without copying, payload data from a location in system memory, or copy such payload data. In either case, upper MAC 135 can retain some portion of the payload that was read, such as a portion that was read to construct the MAC header, and initiate transmission of that data after the MAC header. Remaining payload data can be retrieved while such data is being transmitted.

Some implementations may use driver 12 (or driver 34 for station 30) to control storage of frame payloads in memory 33. In such an approach, driver 12 would obtain an allocation of storage for a frame payload. This allocation may contain a set of locations in memory, each identified by a pointer or reference. Driver 12 can cause the frame payload to be stored in the set of locations, and a relative ordering established by providing, with each location, a pointer to a subsequent location of the set of locations. Then, these pointers can be traversed to obtain the payload of that frame. A pointer to a starting location of the set of locations can be provided for storage in Tx Header Buffer 110. An allocation in Tx Header Buffer 110 can be made, to store that pointer, and other info, such as header information, and a beginning portion of a payload of that frame. The pointer can be used by state machine 119 to begin retrieval of the payload of that frame. As such, both Tx Header Buffer 110 and memory 33 can be allocated in segments.

These memories are allocated in segments, and data stored in these memories are addressed by following pointers (within Tx Header Buffer 110, between header information and also within memory 33 to obtain frame payload data). Thus, while one advantageous implementation is to provide memory 33 as a separate memory from Tx Header Buffer 110 (a different memory technology, for example, and/or a different semiconductor substrate), other implementations also may employ larger onboard memories to store the frame payloads. Driver 12 can be made to support both implementations with little complication.

Figure 7:
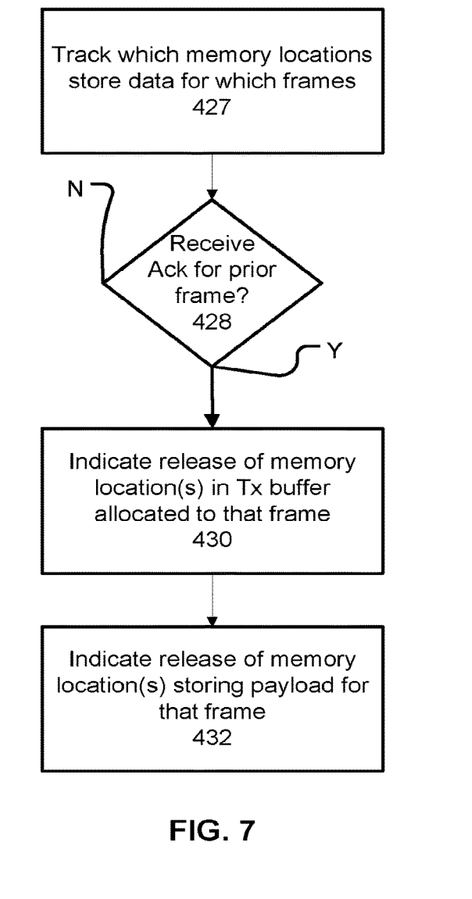
FIG. 7 depicts an example process for memory maintenance according to the disclosure.

FIG. 7 depicts an example approach to releasing memory locations within one or more of memory 33 and Tx header buffer 110, that store portions of payload data. At 427, memory locations storing data for a particular payload that was transmitted can be tracked. Such tracking can, for example, be performed by lower MAC 135, as it generates DMA requests for those locations. In another implementation, memory interface 115 can track these locations. Tracking 427 can also be implemented by tracking only a first location and then following the pointers to each subsequent location. At 428, it is determined than an acknowledgement (ACK) is received for a prior frame, and in response to such ACK, at 430, an indication that memory locations in Tx buffer 110 can be released. Where the MAC frame had only a single payload (e.g., a single MAC header, with a single payload), there may be one location to be released. Where the ACK was for an aggregated frame, multiple locations can be released. Also, if the ACK is a block acknowledgement, that block acknowledgement will be parsed to identify each particular MAC frame acknowledged. At 432, an indication can be provided to release memory locations in memory 33 storing payload for the frame or frames that were acknowledged. Conversely, if an ACK is not received within a timeout period for a particular frame, then a transmit process can be repeated for that frame. Wireless protocols also may implement a negative acknowledgement, and negative acknowledgement also can trigger performance of the transmit process.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects. For example, some aspects were described relative to IEEE 802.11 series wireless transmission standards. However, implementations of the disclosure are not restricted to such standards.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A method of transmitting a payload data unit from a communication device over a wireless network, comprising:
storing payload data for said payload data unit in a system memory of said communication device;
storing, in a private memory local to a Media Access Control (MAC) device, a header of said payload data unit and a reference to a location in the system memory from which to begin retrieving payload data for said payload data unit;
in response to a request to transmit said payload data unit over said wireless network, initiating transmission of a physical layer preamble and header data retrieved from the private memory;

outputting one or more requests to retrieve the payload data of the payload data unit, from the system memory to the MAC device, using the reference to said location in the system memory;

responsive to said one or more requests, receiving data in the MAC device; and providing the received data to a physical layer for transmission over said wireless network.

2. The method of claim 1, further comprising selecting a queue from a plurality of queues based on a Quality of Service (QoS) determination and storing the header in the selected queue.

3. The method of claim 2, wherein the selecting comprises selecting the queue according to characteristics of a type of data to be given the quality of service associated with that queue.

4. The method of claim 3, further comprising obtaining an allocation of a location in the private memory to store the header and associating the location in the private memory with the selected queue.

5. The method of claim 4, wherein the allocation of memory in the system memory for storage of the payload data unit to be transmitted is in 128 byte or 256 byte increments, and further comprising storing, with an increment, a pointer to a location of a subsequent increment.

6. The method of claim 1, further comprising storing in the private memory, in association with the header of the payload data unit, a reference to a location in the private memory storing a next packet in a list of payload data units.

7. The method of claim 6, wherein the list of payload data units defines a queue associated with a particular QOS.

8. The method of claim 6, wherein the locations storing each packet in the list of payload data units are allocated from a pool of slots on demand.

9. The method of claim 1, further comprising tracking the allocation of memory storing the payload data unit.

10. The method of claim 9, further comprising releasing the allocation of memory in response to receiving an acknowledgement of receipt of the payload data unit.

11. The method of claim 1, further comprising generating a subsequent read request for data identified by a pointer obtained from data received in response to a prior request.

12. A wireless networking device, comprising:
a system memory;
a physical layer for transmitting data through a wireless physical layer; and
a Media Access Controller (MAC) component coupled with the system memory through a memory interface, and comprising
a private Random Access Memory (RAM) sized to store a respective header for a plurality of MAC Payload Data Units (PDUs) in association with a respective reference to a respective location in the system memory,
PDU management circuitry for selecting a PDU to be transmitted based on the headers stored in the private RAM, and
Direct Memory Access (DMA) circuitry to receive the reference to the system memory associated with the selected PDU and initiate a transaction with the system memory to begin retrieving payload data for the selected PDU, the payload data being retrieved and supplied to a transmit path before the header for the selected PDU has been completely transmitted.

13. The wireless networking device of claim 12, wherein the MAC component comprises an upper control element and a lower control element, the upper control element implementing the PDU management circuitry within a programmable processor element, and the lower control element interfacing with a memory interface of the MAC component to implement the DMA circuitry without involvement of the upper control element.

14. The wireless networking device of claim 13, wherein the lower control element implements a state machine and determines, after obtaining a transmit slot which frames, from one or more queues, are to be aggregated for aggregated transmission in that transmit slot.

15. The wireless networking device of claim 13, wherein the upper control element couples with the lower control element to indicate a location in the private Random Access Memory (RAM) storing a header for the selected PDU, and the lower control element is configured to obtain the header from the indicated location.

16. The wireless networking device of claim 12, further comprising a processor for executing machine executable code for a driver of the MAC component, the driver configured to obtain an allocation from the system memory for storing a PDU to be transmitted using the MAC component, and storing the PDU in the allocation of system memory.

17. The wireless networking device of claim 16, wherein the memory allocation comprises a plurality of different locations in the system memory, and the driver is configured to produce an ordered list of the different locations that will collectively store the PDU, and to append a reference to each subsequent location in data stored at a respective prior location of the ordered list.

18. The wireless networking device of claim 12, wherein the MAC component is configured to obtain an allocation from the system memory for storing a PDU to be transmitted using the MAC component, and storing the PDU in the allocation of system memory.

19. The wireless networking device of claim 12, wherein the MAC component is adapted to maintain payload data for the selected PDU in the system memory until receipt of the payload data has been acknowledged by a receive device and to retrieve the payload data from the system memory again in order to retry transmission.

20. A non-transitory computer readable storage medium having stored thereon computer executable instructions that when executed cause at least one processor to:
obtain an allocation of memory in a system memory for storage of a body of a packet to be transmitted from a communication device over a wireless network;
store, in a private memory local to a Media Access Control (MAC) device, a header of the packet and a reference to a location in the system memory from which to begin reading the body of the packet;
in response to determining that the packet is to begin transmission, initiate transmission of a physical layer preamble and header data retrieved from the private memory, and output one or more requests to retrieve the body of the packet from the system memory using the reference to the memory location;
cause the MAC device to receive data responsive to the one or more requests; and
provide the received data to a physical layer for transmission over said wireless network.

* * * * *